(12) United States Patent
Hong et al.

(10) Patent No.: US 7,027,364 B2
(45) Date of Patent: Apr. 11, 2006

(54) INFORMATION STORAGE APPARATUS USING A MAGNETIC MEDIUM COATED WITH A WEAR-RESISTANT THIN FILM

(75) Inventors: Seung-bum Hong, Kyungki-do (KR); Jong Up Jeon, Kyungki-do (KR); Hyun-jung Shin, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 376 days.

(21) Appl. No.: 10/232,326

(22) Filed: Sep. 3, 2002

(65) Prior Publication Data

US 2003/0107953 A1 Jun. 12, 2003

(30) Foreign Application Priority Data

Dec. 6, 2001 (KR) .......................... 2001-76974

(51) Int. Cl.
*G11B 11/00* (2006.01)

(52) U.S. Cl. ............... 369/13.01; 369/276; 369/126
(58) Field of Classification Search ............ 369/276, 369/126, 13.01, 13.02, 14, 15, 120, 121, 369/127
See application file for complete search history.

(56) References Cited

U.S. PATENT DOCUMENTS 4,933,926 A * 6/1990 Tabei et al. ............. 369/100
5,184,344 A * 2/1993 Takeuchi et al. ......... 369/126
5,777,977 A * 7/1998 Fujiwara et al. ......... 369/126
5,793,743 A * 8/1998 Duerig et al. ............ 369/126
5,946,284 A * 8/1999 Chung et al. ............ 369/126

FOREIGN PATENT DOCUMENTS

JP  55-139644 A * 10/1980 .............. 369/276
JP  4-349243 A * 12/1992 .............. 369/276

* cited by examiner

*Primary Examiner*—Tan Dinh
(74) *Attorney, Agent, or Firm*—Burns, Doane, Swecker & Mathis, L.L.P.

(57) ABSTRACT

There is provided an information storage apparatus including recording medium and a head. The recording medium has an electrode layer, a magnetic layer that is stacked on the electrode layer, and a wear-resistant thin film that is stacked on the magnetic layer. The head has a conductive probe for injecting charge to record information and sensing the charge injected into the recording medium to reproduce information in a state that the conductive probe contacts the recording medium. A magnetic medium, which is coated with a wear-resistant thin film, stores charges to record information and reproduce information using an electrostatic force. Thus, it is possible to stably store highly integrated information. Also, a probe contacts a recording medium to record and reproduce information at a high speed. Thus, sensitivity and resolution can be improved.

24 Claims, 7 Drawing Sheets

(3 of 7 Drawing Sheet(s) Filed in Color)

INFORMATION STORAGE APPARATUS USING A MAGNETIC MEDIUM COATED WITH A WEAR-RESISTANT THIN FILM

Priority is claimed to Patent Application Number 2001-76974 filed in Republic of Korea on Dec. 6, 2001, herein incorporated by reference.

BACKGROUND OF THE INVENTION

1. Field of the Invention

The present invention relates to an information storage apparatus of a recording medium, and more particularly, to an information storage apparatus using a magnetic medium which is coated with a wear-resistant thin film as a recording medium.

2. Description of the Related Art

One of conventional information storage apparatuses of recording media using a dielectric applies "0" or "1" depending on a polar direction of a dielectric polarization to record information, sense the information using a conductive probe, and reproduce the information.

Figure 1:
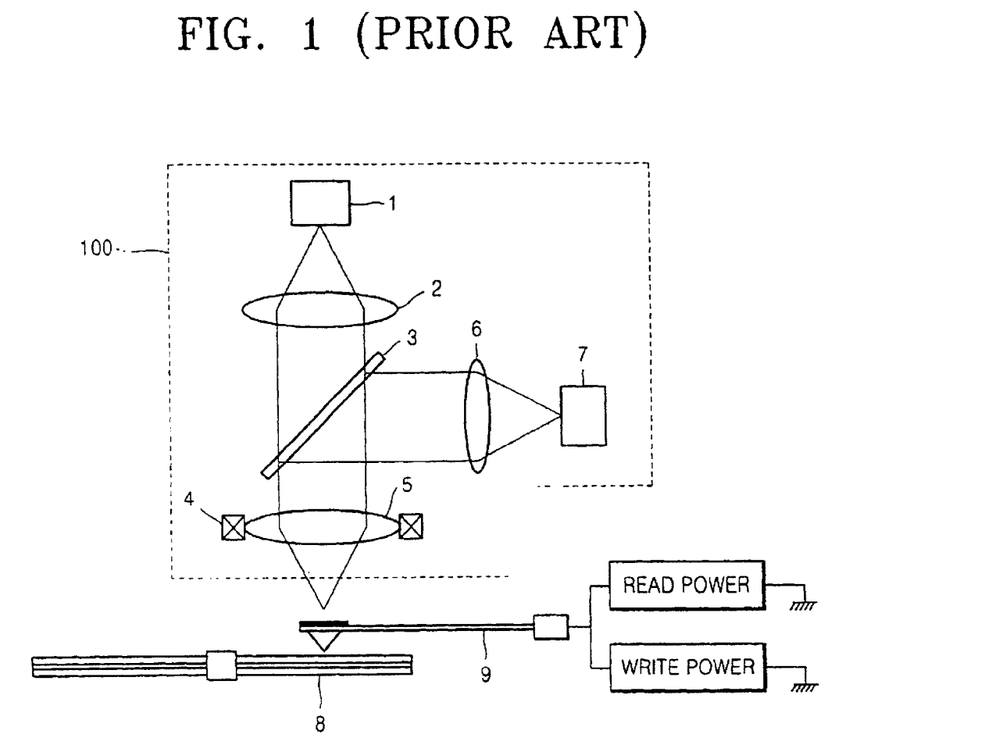
FIG. 1 is a schematic view of a conventional information storage apparatus using a dielectric.

FIG. 1 is a schematic view of a conventional information storage apparatus of a recording medium using a dielectric. Referring to FIG. 1, a conventional information storage apparatus of a recording medium using a dielectric includes a recording medium 8, a head 9, and an optical system 100. Here, the recording medium 8 includes a circular substrate 8a, an electrode layer 8b that is stacked on the circular substrate 8a, and a ferroelectric layer 8c that is stacked on the electrode layer 8b. The head 9 includes a micro tip 9a, which forms a dielectric polarization to record information and reciprocates a section of ¼ of an optical wavelength in a direction vertical to the surface of the recording medium 8, and a reflector 9b for reflecting light depending on polarity of the dielectric polarization. The optical system 100 senses differences in a light path according to the vertical reciprocation of the head 9 to detect recorded information.

Figure 2:
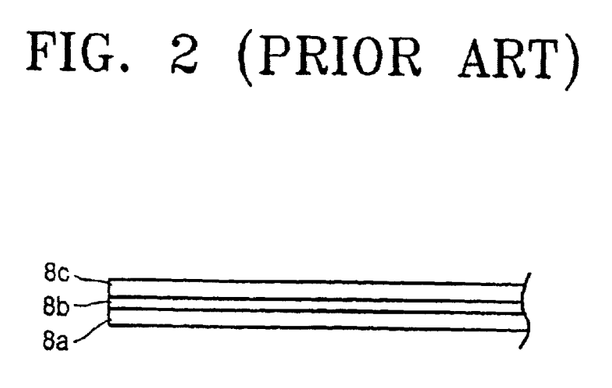
FIG. 2 is a cross-sectional view of a recording medium of a conventional information storage apparatus using a dielectric.

As shown in FIG. 2, the recording medium 8 has a structure in which the electrode layer 8b and the ferroelectric layer 8c are sequentially stacked on the circular substrate 8a.

Figure 3:
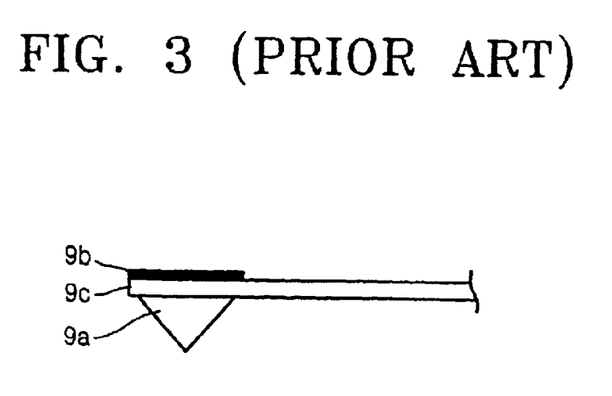
FIG. 3 is a cross-sectional view of a head of a conventional information storage apparatus using a dielectric.

The head 9 includes the micro tip 9a which directly forms a dielectric polarization on the ferroelectric layer 8c to record information and reads information depending on polarity of the dielectric polarization, the reflector 9b for reflecting light, and an arm 9c for supporting the reflector 9a, as shown in FIG. 3.

The optical system 100 includes a laser diode 1 that is a light source 1, a collimating lens 2, a beam splitter 3, an object lens 4, a condensing lens 6, and a light detector 7. Here, the collimating lens 2 collimates light emitted from the light source 1. The beam splitter 3 passes collimation light from the light source 1, but converts the path of light reflected on the surface of the recording medium 8 to direct the path to the light detector 7. The object lens 4 focuses the collimation light on a track of the recording medium 8. The condensing lens 6 condenses reflected light. The detector 7 converts condensed light into an electric signal.

The conventional information storage apparatus of the recording medium 8 using a dielectric polarizes a limited part of the ferroelectric layer 8c using the micro tip 9a to store information. Also, the conventional information storage apparatus moves the micro tip 9a, to which a predetermined voltage is applied, on the recording medium 8 to raise or fall the micro tip 9a by $\lambda/4$ depending on differences in electrostatic force between a polarized portion and a unpolarized portion or an inversely polarized portion. Thus, only light having a light path difference of $\lambda/2$ is split in the beam splitter 3, incident on the light detector 7, and detected in the light detector 7. As a result, information is reproduced.

The conventional information storage apparatus of the recording medium 8 using a dielectric use a principle of storing information depending on a polarization direction of a dielectric to sense the polarization direction of the dielectric in a state that the micro tip 9a does not contact the dielectric layer 8c when sensing information in a recording medium. Thus, sensitivity and resolution are deteriorated. Also, polarizations of the dielectric layer suffer from retention losses as time passes by and thus the capability of information storage is decreased.

A conventional information storage apparatus using a magnetic medium changes the magnetization direction of a recording medium to store information. Also, to reproduce information, the conventional storage apparatus detects a resistance change in a read head due to magneto-resistance effect when the head scans the surface of the magnetic medium. A hard disk drive is given as an example of the conventional information storage apparatus using the magnetic medium.

Figure 4:
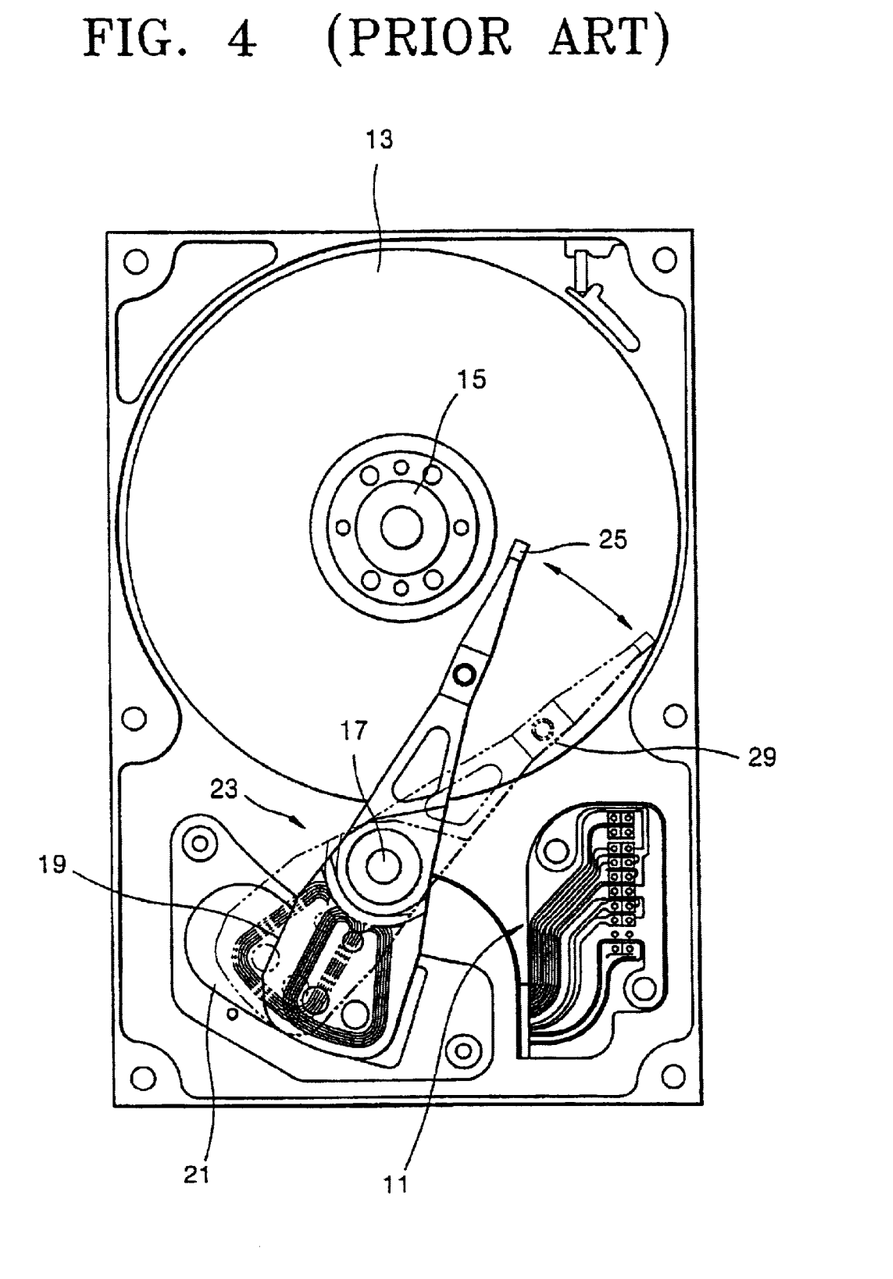
FIG. 4 is a schematic view of a conventional information storage apparatus using a magnetic medium.

FIG. 4 is a schematic view of a conventional hard disk drive. Referring to FIG. 4, the conventional hard disk drive includes a disk 13, a spindle motor 15, an actuator 23, a voice coil motor (VCM) 21, a flexible printed circuit (FPC) 11, and a bracket (not shown). Here, the disk 13 records information and the spindle motor 15 rotates the disk 13. The actuator 23 has a magnetic head 25 which records information on the disk 13 and reproduces information from the disk 13. The VCM 21 actuates the actuator 23. The FPC 11 transmits an electric signal from a printed circuit board (PCB) to the actuator 23. The bracket supports the FPC 11.

The disk 13 is a recording medium which is formed by coating a metal circular plate with a magnetic material. The disk 13 has a parking zone that is minutely manufactured by a laser in an inner region of the disk 13 and combined with the spindle motor 15 to stably place the magnetic head 25 on the disk 13 when power is turned off and a data zone on which a magnetic signal is recorded outside the parking zone. In the data zone, a servo signal for informing the position of information to be recorded is recorded on tens of thousands of tracks along the circular shape of the disk 13 in advance.

The actuator 23 includes a fantail 19, a pivot bearing 17, and a magnetic head 25. The fantail 19 has the VCM 21 which actuates the actuator 23. The pivot bearing 17 serves as a pivot of the actuator 23. The magnetic head 25 has a write head for recording information on the disk 13 and a read head for reproducing information from the disk 13.

To record information on the conventional hard disk drive, the write head moves with the rotation of the actuator 23 by an electric signal applied to the PCB to magnetize a desired track using a magnetic field during the rotation of the disk 13. The actuator 23 re-rotates to sense the magnetic direction of the disk 13 using the read head to reproduce recorded information as previously described.

In the conventional hard disk drive, the magnetic head 25 does not contact the disk 13 during the operation of the disk 13 due to floating force occurring when the disk 13 rotates. In the conventional hard disk drive, the magnetic field is widened as the height of the magnetic head 25 is higher. However, the smaller amount of information is recorded. Thus, an attempt to increase the integration of information by lowering the height of the magnetic head 25 has been made. However, as the distance between the disk 13 and the magnetic head 25 is reduced, the probability that the disk 13 will contact the magnetic head 25 increases. If the disk 13 contacts the magnetic head 25, the high-speed rotation and the highly hard surface of the disk 13 may damage the magnetic head 25 or information.

SUMMARY OF THE INVENTION

To solve the above-described problems, it is an object of the present invention to provide an information storage apparatus which uses an existing magnetic medium as a recording medium without the improvement and modification of the magnetic medium, but has high sensitivity and resolution and an excellent charge storage capability.

Accordingly, to achieve the above object, there is provided an information storage apparatus using charge. The information storage apparatus includes a recording medium and a head. The recording medium has an electrode layer, a magnetic layer that is stacked on the electrode layer, and a wear-resistant thin film that is stacked on the magnetic layer. The head has a conductive probe for injecting charge to record information and sensing the charge injected into the recording medium to reproduce information in a state that the conductive probe contacts the recording medium.

Here, the charge is injected by differences in potential between the electrode layer and the conductive probe.

The charge is injected into an interface between the magnetic layer and the electrode layer or an interface between the magnetic layer and the wear-resistant thin film, or inside the wear-resistant thin film or onto the surface of the wear-resistant thin film.

It is preferable that the wear-resistant thin film is diamond like carbon.

The wear-resistant thin film may be chrome oxide.

It is preferable that the conductive probe has a tip with a diameter of 50 nm or less.

It is preferable that the conductive probe is a conic probe, a pyramidic probe, or a cylindrical probe.

The recording medium may be a rotary recording medium or a stage type recording medium which is actuated in an X-axis or Y-axis direction.

To achieve the above object, there is provided an information storage apparatus using charge. The information storage apparatus includes a recording medium and a head. The recording medium has an electrode layer, a metal layer that is stacked on the electrode layer, and a wear-resistant thin film that is stacked on the metal layer. The head has a conductive probe for injecting charge to record information and reproducing information by phase shift due to the charge injected into the recording medium in a state that the conductive probe contacts the recording medium.

Here, the charge is injected by differences in potential between the electrode layer and the conductive probe.

The charge is injected into an interface between the metal layer and the electrode layer or an interface between the metal layer and the wear-resistant thin film, or inside the wear-resistant thin film or onto the surface of the wear-resistant thin film.

It is preferable that the wear-resistant thin film is diamond like carbon.

The wear-resistant thin film may be chrome oxide.

It is preferable that the conductive probe has a tip with a diameter of 50 nm or less.

It is preferable that the conductive probe is one of a conic probe, a pyramidic probe, or a cylindrical probe.

Here, the recording medium may be a rotary recording medium or a stage type recording medium which is actuated in an X-axis or Y-axis direction.

According to the present invention, a recording medium contacts a probe to record and reproduce information. Thus, an information storage apparatus having good sensitivity and resolution can be provided. Also, charge is injected into the recording medium to extend the time required for storing information. Thus, a stable information storage apparatus can be provided.

BRIEF DESCRIPTION OF THE DRAWINGS

This application file contains at least one drawing executed in color. Copies of the color drawings are enclosed.

The above object and advantages of the present invention will become more apparent by describing in detail preferred embodiments thereof with reference to the attached drawings in which.

DETAILED DESCRIPTION OF THE INVENTION

Hereinafter, an embodiment of an information storage apparatus of a magnetic medium according to the present invention will be described in detail with reference to the attached drawings. Here, like reference numerals in the drawings denote the same members. In drawings, the thicknesses of layers or regions are exaggerated for clarity.

Figure 5A:
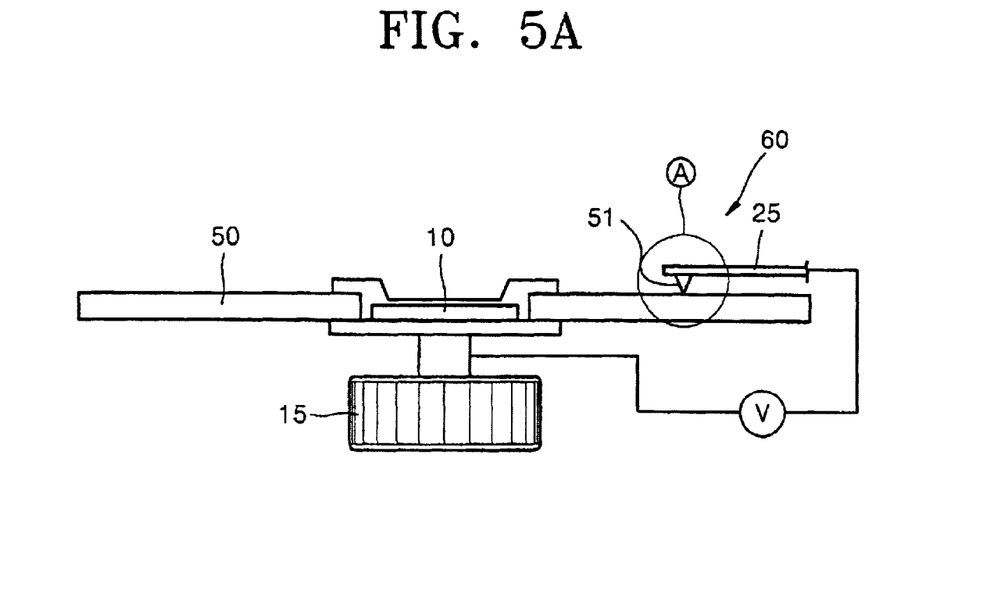
FIG. 5A is a cross-sectional view of an information storage apparatus of rotary recording medium according to a first embodiment of the present invention.
Figure 5B:
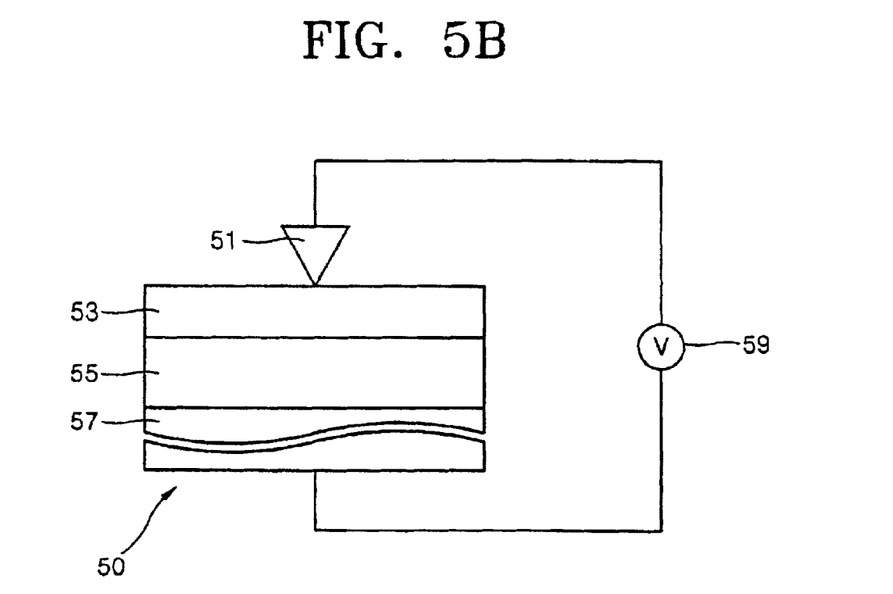
FIG. 5B is an enlarged view of a portion A shown in FIG. 5A explaining the principle of an information storage apparatus according to the first embodiment of the present invention.

FIG. 5A is a cross-sectional view of an information storage apparatus of rotary recording medium according to a first embodiment of the present invention. FIG. 5B is an enlarged view of a portion A shown in FIG. 5A explaining the principle of an information storage apparatus according to the first embodiment of the present invention.

Referring to FIG. 5A, an information storage apparatus according to a first embodiment of the present invention includes a recording medium 50 which is stably placed on a spindle motor 15 and a conductive probe 51 which contacts the recording medium 50 to record and reproduce information. The conductive probe 51 is supported by a cantilever 25. Here, the recording medium 50 is a rotary recording medium. FIG. 5B is referred to in order to describe the information storage apparatus according to the embodiment of the present invention in detail.

As shown in FIG. 5B, the information storage apparatus includes a recording medium 50 and a head 60. The recording medium is formed of an electrode layer 57, a magnetic layer 55 that is stacked on the electrode layer 57, and a wear-resistant thin film 53 that is stacked on the magnetic layer 55. The head has a conductive probe 51 which contacts the wear-resistant thin film 53 to record and reproduce information. Here, the magnetic layer 55 may be replaced with a metal layer. The recording medium 50 may be a rotary recording medium or a stage type recording medium which is driven in an X-axis or Y-axis direction.

When recording information on the information storage apparatus according to the embodiment of the present invention, the conductive probe 51 contacts the wear-resistance thin film 53 to inject charges inflowing from a power source 59 into the wear-resistant thin film 53. Here, polarities of voltages applied to the conductive probe 51 and the electrode layer 57 alternately vary and thus information "0" and "1" is respectively recorded. The power source 59 applies voltages having alternating current (AC) and direct current (DC) to the conductive probe 51 and the electrode layer 57.

The recording of information depends on specific characteristics of the wear-resistant thin film 53. The wear-resistant thin film 53 is mainly diamond like carbon (DLC).

DLC, which is a carbon film made of graphite using an ion deposition method, has properties similar to those of diamond. DLC is amorphous and different from diamond crystal in structure, but similar to diamond in property. DLC has a hardness of about 3000–5000 HV and resistivity of about $10^6$–$10^{14}$ Ω cm. DLC is mainly used as a wear-resistant thin film since it has a low coefficient of friction of 0.1 which is characterized as having high hardness and smooth surface. Instead of DLC, chrome may be used as a wear-resistant thin film.

Charges can be stored in the wear-resistant thin film 53, the interface between the wear-resistant thin film 53 and the magnetic layer 55, or the interface between the magnetic layer 55 and the electrode layer 57 which charges are injected into the recording medium 50.

In particular, a second resistant layer, which serves as lateral resistance, is used to minimize leakage of current between a gate and a focus electrode. When the information storage apparatus according to the embodiment of the present invention reproduces information, an AC voltage is applied to the conductive probe 51 and the electrode layer 57. Here, the conductive probe 51 contacts the wear-resistant thin film 53 and oscillates at the same frequency as the AC voltage by electrostatic force. Phase of this mechanical oscillation of the conductive probe 51 is shifted based on injected charge. This phase shift is compared with the AC voltage and then information "0" and "1" are respectively recorded when the conductive probe 51 has the same phase as the AC voltage and is 180 degrees out of phase with the AC voltage. As a result, information is reproduced.

The present invention basically uses the principle of electrostatic force due to charge to reproduce information. Phase shift occurs when reproducing information if positive and negative charges are injected. The phase shift is sensed to reproduce information as described above.

The conductive probe 51 may be formed of a conductive metal to inject charge and be coated with DLC to increase wear-resistance. The conductive probe 51 has a tip with a diameter of 50 nm or less and is preferably conic, pyramidic, or cylindrical.

Figure 6:
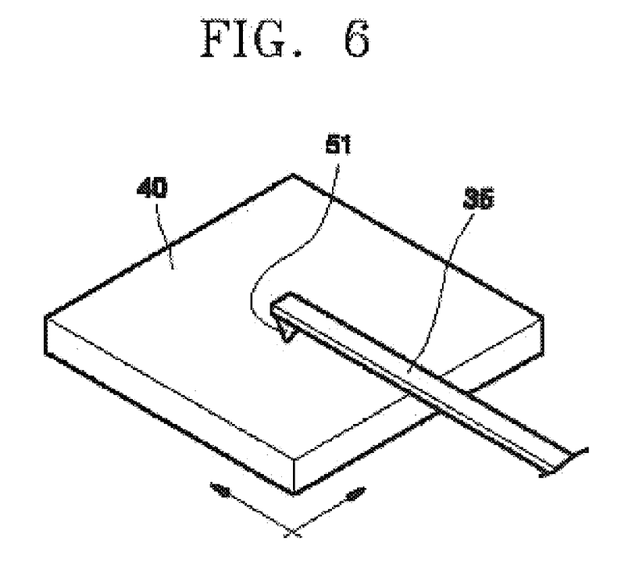
FIG. 6 is a view of an information storage apparatus of a stage type recording medium according to a second embodiment of the present invention.

FIG. 6 is a view of an information storage apparatus of a stage type recording medium, which is actuated in an X-axis or Y-axis direction, according to a second embodiment of the present invention. Referring to FIG. 6, the information storage apparatus according to the second embodiment of the present invention includes a recording medium 40, a conductive probe 51, and a cantilever 25. The stage type recording medium 40 is actuated in an X-axis or Y-axis direction. The conductive probe 51 contacts the stage type recording medium 40 to record and reproduce information. The cantilever 25 supports the conductive probe 51. The method of recording and reproducing information in the information storage apparatus according to the second embodiment of the present invention is the same as the method of recording and reproducing information in the information storage apparatus according to the first embodiment of the present invention.

Figure 7A:
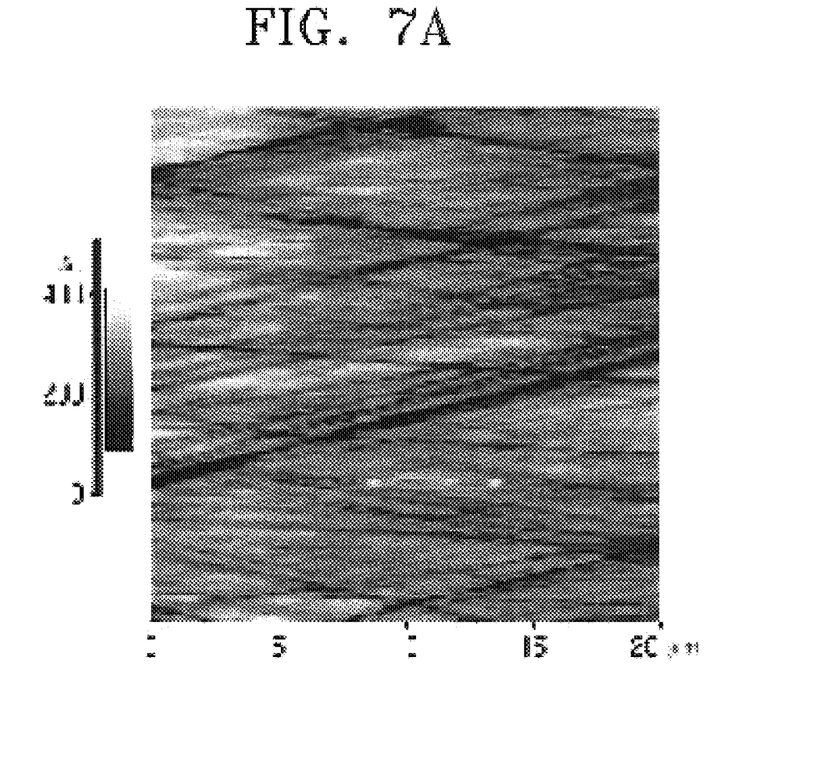
FIGS. 7A through 7D are photographs showing the surface of a recording medium after positive and negative charges are stored at the same place according to an embodiment of the present invention.
Figure 7B:
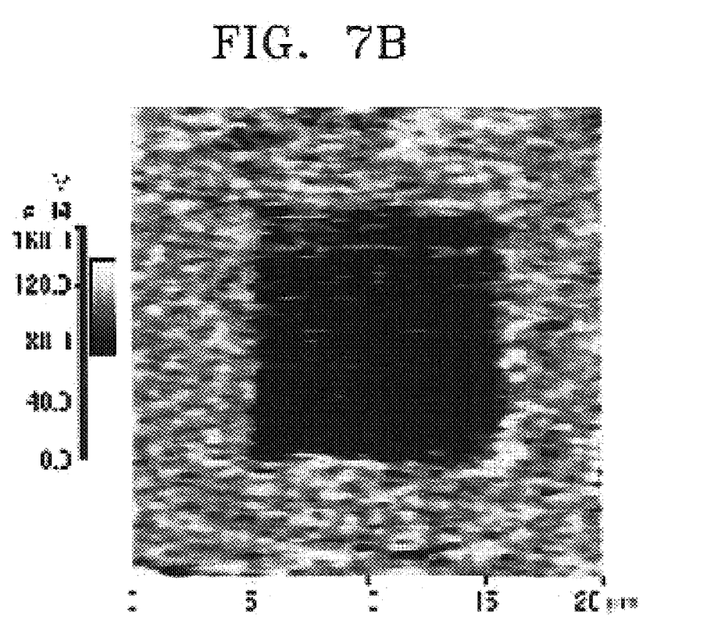
Figure 7C:
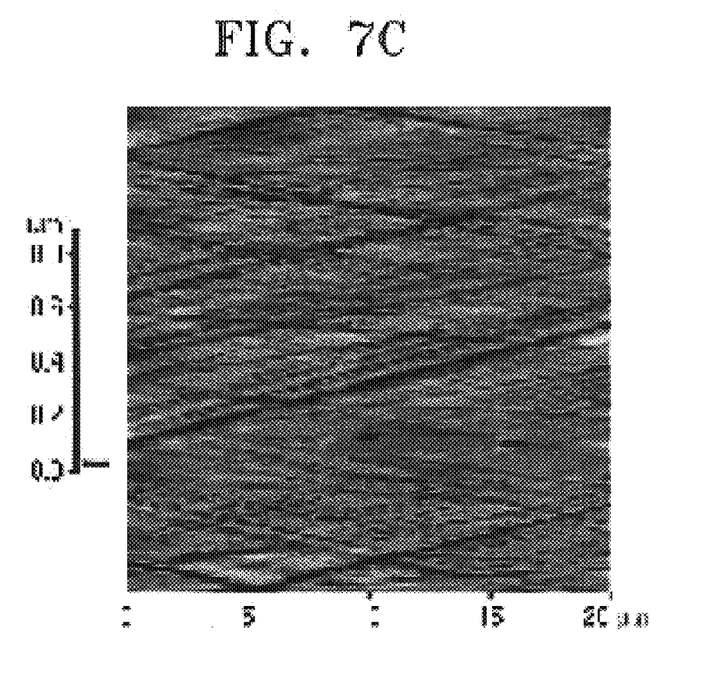
Figure 7D:
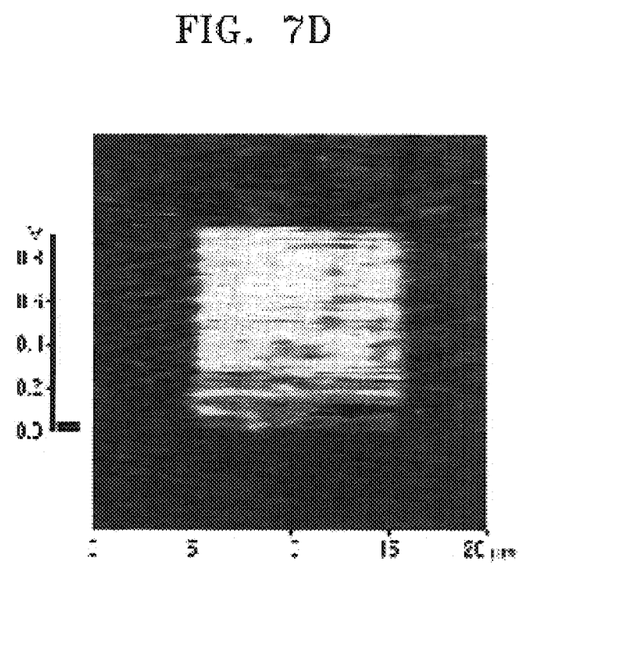

FIGS. 7A through 7D are photographs showing that a hard disk drive on which a wear-resistant thin film is stacked is charged with a positive or negative charge to record and reproduce information. FIGS. 7A and 7C are photographs of surface topography of a portion of a recording medium which is charged with a positive or negative charge using an atomic force in a state that the recording medium contacts a probe. FIGS. 7B and 7D are photographs of variations in electrostatic force occurring when the conductive probe 51 scans the surface of the recording medium 50 and an AC electric field having a high frequency of 17 kHz is applied to the surface of the recording medium 50, which are sensed by the conductive probe 51.

FIG. 7A shows surface topography of a hard disk drive which is charged with a positive charge and FIG. 7B shows the distribution of charges on a hard disk drive which is charged with a positive charge. A black square portion of about 10 μm in the center of FIG. 7B is a portion which is charged with the positive charge. Thus, in FIGS. 7A and 7B, it is seen that only charge distribution is detected without greatly distorting the surface of the hard disk drive to record and reproduce information.

FIG. 7C shows surface topography of a hard disk drive which is charged with a negative charge and FIG. 7C shows the distribution of charges on a hard disk drive which is charged with a negative charge. A white square portion of about 10 μm in the center of FIG. 7D is a portion which is charged with the negative charge.

From a test result, it can be seen that it is possible to inject charges into a hard disk drive which is coated with a wear-resistant thin film, to record information "0" and "1" depending on the injection of positive and negative charges, and to sense the electrostatic force of the positive and negative charges using a probe to reproduce information by recording information "0" and "1" depending on phase shift.

According to the present invention, charge can be injected into a magnetic medium which is coated with a wear-resistant thin film to record information. Recorded information can be reproduced by electrostatic force to store highly integrated information. Thus, a recording medium having an excellent information storage capability can be provided and information can be reproduced by electrostatic force at a high speed. Also, a conductive probe contacts the recording medium to record and reproduce information. Thus, sensitivity and resolution can be improved.

As described above, in an information storage apparatus using storage of charges according to the present invention, a conventional magnetic medium is used, but a wear-resistant thin film stores charges to record information and reproduce information using electrostatic force. Thus, it is possible to stably store highly integrated information and to reproduce information at a high speed. Also, a probe contacts a recording medium to record and reproduce information. Thus, sensitivity and resolution can be improved.

Many contents have particularly been described in the description, but must be interpreted as an example of a preferred embodiment not as restricting the scope of the present invention.

For example, those skilled in the art can form a magnetic layer of another medium or replace a wear-resistant thin film with another material having a property similar to diamond like carbon without departing from the spirit and scope of the invention. Thus, the scope of the present invention must be defined by the appended claims not the described embodiments.

What is claimed is:

1. An information storage apparatus using charge, the information storage apparatus comprising:
   a recording medium having an electrode layer, a magnetic layer that is stacked on the electrode layer, and a wear-resistant thin film that is stacked on the magnetic layer; and
   a head having a conductive probe for injecting charge to record information and sensing the charge injected into the recording medium to reproduce information in a state that the conductive probe contacts the recording medium.

2. The information storage apparatus of claim 1, wherein the charge is injected by differences in potential between the electrode layer and the conductive probe.

3. The information storage apparatus of claim 2, wherein the charge is injected into an interface between the magnetic layer and the electrode layer.

4. The information storage apparatus of claim 2, wherein the charge is injected into an interface between the magnetic layer and the wear-resistant thin film.

5. The information storage apparatus of claim 2, wherein the charge is injected inside the wear-resistant thin film or onto the surface of the wear-resistant thin film.

6. The information storage apparatus of claim 1, wherein the wear-resistant thin film is diamond like carbon.

7. The information storage apparatus of claim 1, wherein the wear-resistant thin film is chrome oxide.

8. The information storage apparatus of claim 6, wherein the conductive probe has a tip with a diameter of 50 nm or less.

9. The information storage apparatus of claim 7, wherein the conductive probe has a tip with a diameter of 50 nm or less.

10. The information storage apparatus of claim 1, wherein the conductive probe is one of a conic probe, a pyramidic probe, and a cylindrical probe.

11. The information storage apparatus of claim 1, wherein the recording medium is a rotary recording medium.

12. The information storage apparatus of claim 1, wherein the recording medium is a stage type recording medium which is actuated in an X-axis and/or Y-axis direction.

13. An information storage apparatus using charge, the information storage apparatus comprising:
    a recording medium having an electrode layer, a metal layer that is stacked on the electrode layer, and a wear-resistant thin film that is stacked on the metal layer; and
    a head having a conductive probe for injecting charge to record information and reproducing information by phase shift due to the charge injected into the recording medium in a state that the conductive probe contacts the recording medium.

14. The information storage apparatus of claim 13, wherein the charge is injected by differences in potential between the electrode layer and the conductive probe.

15. The information storage apparatus of claim 14, wherein the charge is injected into an interface between the metal layer and the electrode layer.

16. The information storage apparatus of claim 14, wherein the charge is injected into an interface between the metal layer and the wear-resistant thin film.

17. The information storage apparatus of claim 14, wherein the charge is injected inside the wear-resistant thin film or onto the surface of the wear-resistant thin film.

18. The information storage apparatus of claim 13, wherein the wear-resistant thin film is diamond like carbon.

19. The information storage apparatus of claim 13, wherein the wear-resistant thin film is chrome oxide.

20. The information storage apparatus of claim 18, wherein the conductive probe has a tip with a diameter of 50 nm or less.

21. The information storage apparatus of claim 19, wherein the conductive probe has a tip with a diameter of 50 nm or less.

22. The information storage apparatus of claim 13, wherein the conductive probe is one of a conic probe, a pyramidic probe, and a cylindrical probe.

23. The information storage apparatus of claim 13, wherein the recording medium is a rotary recording medium.

24. The information storage apparatus of claim 13, wherein the recording medium is a stage type recording medium which is actuated in an X-axis or Y-axis direction.

* * * * *